United States Patent
Zhu et al.

(10) Patent No.: US 10,148,565 B2
(45) Date of Patent: Dec. 4, 2018

(54) OPENFLOW COMMUNICATION METHOD AND SYSTEM, CONTROLLER, AND SERVICE GATEWAY

(71) Applicant: Huawei Technologies Co., Ltd., Shenzhen (CN)

(72) Inventors: Ren Zhu, Shenzhen (CN); Wei Zhou, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 94 days.

(21) Appl. No.: 15/369,191

(22) Filed: Dec. 5, 2016

(65) Prior Publication Data

US 2017/0085473 A1    Mar. 23, 2017

Related U.S. Application Data

(63) Continuation of application No. PCT/CN2014/079084, filed on Jun. 3, 2014.

(51) Int. Cl.
*H04L 12/715* (2013.01)
*H04L 12/751* (2013.01)
(Continued)

(52) U.S. Cl.
CPC .......... *H04L 45/64* (2013.01); *H04L 12/4633* (2013.01); *H04L 12/66* (2013.01);
(Continued)

(58) Field of Classification Search
None
See application file for complete search history.

(56) References Cited

U.S. PATENT DOCUMENTS 8,023,414 B2 * 9/2011 Soja-Molloy ........... H04L 45/00
  370/238
8,640,127 B2    1/2014 Gracin
(Continued)

FOREIGN PATENT DOCUMENTS

CN    102843300 A    12/2012
CN    102884763 A    1/2013
(Continued)

OTHER PUBLICATIONS

Machine Translation and Abstract of Japanese Publication No. JP2015159500, Sep. 3, 2015, 17 pages.
(Continued)

*Primary Examiner* — Bunjob Jaroenchonwanit
(74) *Attorney, Agent, or Firm* — Conley Rose, P.C.

(57) ABSTRACT

In an OPENFLOW communication method an action that needs to be transferred and sent by the service gateway is received, one appropriate virtual switch is selected according to the action and a network topology, a flow table is delivered to the service gateway and the virtual switch, and a first data channel is established between the service gateway and the virtual switch to forward a packet, a flow table including an extended action is delivered to the virtual switch so as to execute a related extended action on the packet, the packet is obtained after the virtual switch executes the related extended action is sent to a destination server. Accordingly, some data processing services are transferred to a virtual server when a processing capability of a service gateway is insufficient such that the virtual service implements load balance among network elements in a system.

16 Claims, 6 Drawing Sheets

(51) Int. Cl.
*H04L 12/741* (2013.01)
*H04L 12/931* (2013.01)
*H04L 12/66* (2006.01)
*H04L 12/46* (2006.01)

(52) U.S. Cl.
CPC ............ *H04L 45/02* (2013.01); *H04L 45/745* (2013.01); *H04L 49/70* (2013.01)

(56) References Cited

U.S. PATENT DOCUMENTS

| | | | |
|---|---|---|---|
| 9,641,353 B2* | 5/2017 | Wang | H04L 12/46 |
| 9,661,522 B2* | 5/2017 | Kavunder | H04W 28/0215 |
| 9,692,696 B2* | 6/2017 | DeCusatis | H04L 45/72 |
| 9,853,898 B1* | 12/2017 | Subramanian | H04L 45/745 |
| 9,882,733 B2* | 1/2018 | Hua | H04L 61/2069 |
| 2005/0027404 A1 | 2/2005 | Ban et al. | |
| 2006/0277303 A1 | 12/2006 | Hegde et al. | |
| 2008/0276093 A1 | 11/2008 | Kwak et al. | |
| 2012/0023231 A1 | 1/2012 | Ueno | |
| 2013/0055257 A1 | 2/2013 | Yamashita | |
| 2013/0170503 A1 | 7/2013 | Ooishi | |
| 2013/0176888 A1 | 7/2013 | Kubota et al. | |
| 2013/0311778 A1 | 11/2013 | Cherukuri et al. | |
| 2013/0318219 A1* | 11/2013 | Kancherla | H04L 49/70 709/222 |
| 2013/0332399 A1* | 12/2013 | Reddy | G06N 99/005 706/12 |
| 2014/0105039 A1* | 4/2014 | McDysan | H04L 45/306 370/252 |
| 2015/0169351 A1* | 6/2015 | Song | H04L 12/4641 718/1 |
| 2015/0281078 A1* | 10/2015 | Luo | H04L 67/2814 709/203 |
| 2016/0149724 A1* | 5/2016 | Wang | H04L 12/46 370/392 |
| 2016/0364226 A1* | 12/2016 | Takano | G06F 8/65 |
| 2016/0373357 A1* | 12/2016 | Keesara | H04L 45/12 |
| 2017/0099188 A1* | 4/2017 | Chang | H04L 12/4633 |
| 2017/0180274 A1* | 6/2017 | Liu | H04L 49/70 |
| 2017/0302501 A1* | 10/2017 | Shi | H04L 29/12009 |
| 2017/0366446 A1* | 12/2017 | Davie | G06F 9/45533 |

FOREIGN PATENT DOCUMENTS

| | | | |
|---|---|---|---|
| CN | 103179046 A | 6/2013 | |
| CN | 103329488 A | 9/2013 | |
| CN | 103621027 A | 3/2014 | |
| JP | 2015159500 A | 9/2015 | |
| KR | 20070023697 A | 2/2007 | |
| KR | 20130052030 A | 5/2013 | |
| KR | 20130052031 A | 5/2013 | |
| WO | 2006091411 A2 | 8/2006 | |
| WO | 2011049135 A1 | 4/2011 | |
| WO | 2013126195 A1 | 8/2013 | |

OTHER PUBLICATIONS

Matsumoto, A., et al., "Study for Optimization of inter-VMs traffic in Cloud environment, Reduce Latency by Delegation of L3 function to OVS," IEICE Technical Report, vol. 113, No. 303, Nov. 14, 2013, 10 pages.
English Translation of Matsumoto, A., et al., "Study for Optimization of inter-VMs traffic in Cloud environment, seduce Latency by Delegation of L3 function to OVS," IEICE Technical Report, vol. 113, No. 303, Nov. 14, 2013, 13 pages.
Foreign Communication From a Counterpart Application, Japanese Application No. 2016-571162, Japanese Office Action dated Jan. 23, 2018, 2 pages.
Foreign Communication From a Counterpart Application, Japanese Application No. 2016-571162, English Translation of Japanese Office Action dated Jan. 23, 2018, 2 pages.
Machine Translation and Abstract of Korean Publication No. KR20070023697, Feb. 28, 2007, 41 pages.
Foreign Communication From a Counterpart Application, Korean Application No. 10-2016-7036645, Korean Office Action dated Feb. 26, 2018, 7 pages.
Foreign Communication From a Counterpart Application, Korean Application No. 10-2016-7036645, English Translation of Korean Office Action dated Feb. 26, 2018, 8 pages.
Machine Translation and Abstract of Chinese Publication No. CN102843300, Dec. 26, 2012, 11 pages.
Machine Translation and Abstract of Chinese Publication No. CN102884763, Jan. 16, 2013, 14 pages.
Machine Translation and Abstract of Chinese Publication No. CN103179046, dated Jun. 26, 2013, 9 pages.
Koerner, M., et al., "Multiple Service Load-Balancing with OpenFlow," IEEE International Conference on High Performance Switching and Routing, 2012, pp. 210-214.
Uppal, H., et al., "OpenFlow Based Load Balancing," University of Washington, CSE561: Networking, 2010, 7 pages.
"OpenFlow Switch Specification," Version L3.0 (Wire Protocol 0x04), ONF TS-006, Jun. 25, 2012, 106 pages.
Foreign Communication From a Counterpart Application, European Application No. 14894130.5, Extended European Search Report dated May 12, 2017, 7 pages.
Foreign Communication From a Counterpart Application, PCT Application No. PCT/CN2014/079084, English Translation of International Search Report dated Mar. 9, 2015, 2 pages.
Foreign Communication From a Counterpart Application, PCT Application No. PCT/CN2014/079084, English Translation of Written Opinion dated Mar. 9, 2015, 6 pages.

* cited by examiner

→ Network topology information
--→ Flow table information
·····→ Packet

OPENFLOW COMMUNICATION METHOD AND SYSTEM, CONTROLLER, AND SERVICE GATEWAY

CROSS-REFERENCE TO RELATED APPLICATIONS

This application is a continuation of International Application No. PCT/CN2014/079084, filed on Jun. 3, 2014, which is hereby incorporated by reference in its entirety.

TECHNICAL FIELD

The present disclosure relates to the communications field, and in particular, to an OPENFLOW communication method and system, a controller, and a service gateway.

BACKGROUND

With economic and social globalization, an increasing quantity of enterprises and organizations establish branches nationwide and even worldwide, and an increasing quantity of employees on business trips access headquarters' service systems from fixed locations. In addition, as services continuously expand and application becomes increasingly complex, an information technology (IT) infrastructure of an organization is developing toward centralized management, and setting up data centers and cloud services has been a trend of IT construction. An enterprise service gateway is an entrance to a data center and cloud service center. A throughput capability of the enterprise service gateway directly affects performance of the entire data center and cloud service center.

Figure 1:
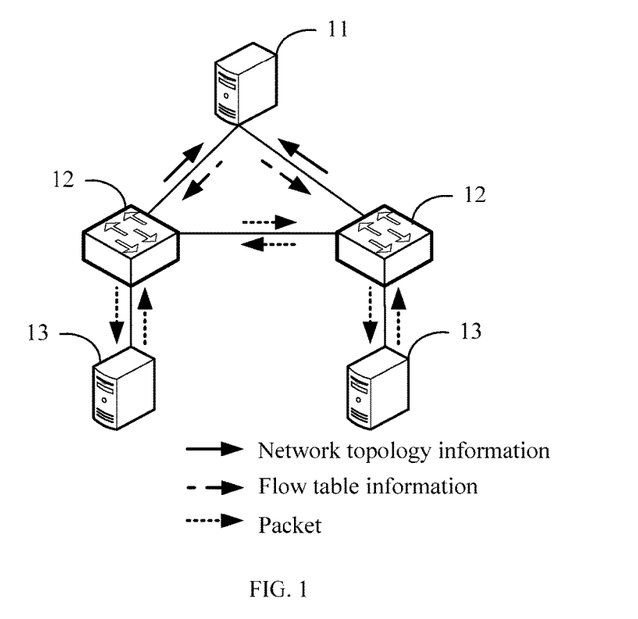
FIG. 1 is a diagram of an OPENFLOW network topology structure.

OPENFLOW, a new network switching model supporting network innovation researches, was put forward by Stanford University in the United States. The OPENFLOW protocol is gradually improved and successfully applied to an actual network, where application of the OPENFLOW protocol to a data center network is particularly prominent. As shown in FIG. 1, a topology structure of an OPENFLOW network includes an OPENFLOW controller 11, an OPENFLOW switch 12, a terminal 13, and links connecting the OPENFLOW controller 11, OPENFLOW switch 12, and terminal 13. The OPENFLOW controller 11 stores a topology structure of an entire network, generates a flow table for a data flow that needs to be forwarded, and delivers the flow table to a corresponding switch. The OPENFLOW switch 12 stores flow table information delivered by the OPENFLOW controller 11 and performs data forwarding between the OPENFLOW switches 12 and between the OPENFLOW switch 12 and the terminal 13.

A topology structure of the data center network is generally a tree structure. The enterprise service gateway, as the entrance (a root) to the data center, is responsible for network forwarding and further needs to perform particular processing on data, for example in terms of network security, to perform "encryption/decryption, Deep Packet Inspection (DPI), and the like" on the data, and to perform data compression and decompression, and the like. The processing includes the following steps:

1. The enterprise service gateway receives a client request and performs data processing such as security detection (Internet Protocol Security (IPSEC), and DPI) on data.

2. After the data processing is completed, a to-be-processed packet is forwarded to a back-end server according to a service type of the request.

3. The server performs processing, and forwards a result of the processing to the enterprise service gateway.

4. The enterprise service gateway receives service data, performs particular processing on the service data, and forwards an encapsulated packet to a client.

An enterprise service gateway serves as an entrance to an entire data center. When a to-be-processed data volume exceeds a capability of the enterprise service gateway, the enterprise service gateway becomes a bottleneck of an entire system, whereas a large quantity of computing resources on a back-end server are idle. Therefore, a method for resolving the bottleneck problem needs to be found.

SUMMARY

In view of this, embodiments of the present disclosure provide an OPENFLOW communication method and system, a controller, and a service gateway, which can implement load balance among network elements in a system, improve utilization and a throughput of the system, and further enhance performance of the entire system.

According to a first aspect, an OPENFLOW communication method is provided, where the method includes receiving a transfer processing request sent by a service gateway, where the transfer processing request includes an action that needs to be transferred, selecting one server as a virtual switch according to the action that needs to be transferred and a network topology structure, delivering a first flow table to the service gateway, where the first flow table is used for the service gateway to forward a packet to the virtual switch, and delivering a second flow table to the virtual switch, where the second flow table includes an instruction used to instruct the virtual switch to execute the action on the packet such that the virtual switch executes the action on the packet and sends a packet obtained after the action is executed to a destination server of the packet.

With reference to the first aspect, in a first possible implementation manner, the method further includes if the virtual switch has no flow table for sending the packet to the destination server of the packet, receiving a message that requests a processing rule of the packet and is sent by the virtual switch for the packet, and delivering a third flow table to the virtual switch, where the third flow table is used for the virtual switch to send the packet obtained after the action is executed to the destination server of the packet.

With reference to the implementation manner of the first aspect, in a second possible implementation manner, the action includes at least one of packet encryption, packet decryption, deep packet inspection, data compression, or data decompression.

According to a second aspect, a controller is provided, including a receiving module, configured to receive a transfer processing request sent by a service gateway, where the transfer processing request includes an action that needs to be transferred, a selection module, configured to select one server as a virtual switch according to the action that needs to be transferred and a network topology structure, a first flow table delivering module, configured to deliver a first flow table to the service gateway, where the first flow table is used for the service gateway to forward a packet to the virtual switch, and a second flow table delivering module, configured to deliver a second flow table to the virtual switch, where the second flow table includes an instruction used to instruct the virtual switch to execute the action on the packet such that the virtual switch executes the action on the packet and sends a packet obtained after the action is executed to a destination server of the packet.

With reference to an implementation manner of the second aspect, in a first possible implementation manner, if the virtual switch has no related flow table, the controller further includes a third flow table delivering module, where the receiving module receives a message that requests a processing rule of the packet and is sent by the virtual switch for the packet, and the third flow table delivering module delivers a third flow table to the virtual switch, where the third flow table is used for the virtual switch to send the packet obtained after the action is executed to the destination server of the packet.

With reference to the implementation manner of the second aspect, in a second possible implementation manner, the action includes at least one of packet encryption, packet decryption, deep packet inspection, data compression, or data decompression.

According to a third aspect, an OPENFLOW communication method is provided, including when load exceeds a preset threshold, sending a transfer processing request to a controller, where the transfer processing request includes an action that needs to be transferred such that the controller selects one server as a virtual switch, receiving a flow table delivered by the controller, and forwarding a packet to the virtual switch according to the flow table such that the virtual switch executes the action on the packet and sends a packet obtained after the action is executed to a destination server of the packet.

With reference to an implementation manner of the third aspect, in a first possible implementation manner, the forwarding a packet to the virtual switch according to the flow table is forwarding the packet encapsulated in an encapsulating an IP in another IP (IP_IN_IP) manner to the virtual switch according to the flow table.

With reference to the implementation manner of the third aspect, in a second possible implementation manner, the action includes at least one of packet encryption, packet decryption, deep packet inspection, data compression, or data decompression.

According to a fourth aspect, a service gateway is provided, including a sending module, configured to, when load exceeds a preset threshold, send a transfer processing request to a controller, where the transfer processing request includes an action that needs to be transferred such that the controller selects one server as a virtual switch, a receiving module, configured to receive a flow table delivered by the controller, and a forwarding module, configured to forward a packet to the virtual switch according to the flow table such that the virtual switch executes the action on the packet and sends a packet obtained after the action is executed to a destination server of the packet.

With reference to an implementation manner of the fourth aspect, in a first possible implementation manner, the forwarding module is configured to forward the packet encapsulated in an IP_IN_IP manner to the virtual switch according to the flow table.

With reference to the implementation manner of the fourth aspect, in a second possible implementation manner, the action includes at least one of packet encryption, packet decryption, deep packet inspection, data compression, or data decompression.

According to a fifth aspect, a controller is provided, including a receiver, a processor, a transmitter, and a memory, where the receiver is configured to receive a transfer processing request sent by a service gateway, where the transfer processing request includes an action that needs to be transferred, the memory is configured to store program code, the processor is connected to the receiver and configured to invoke the program code stored in the memory to execute the following method selecting one server as a virtual switch according to the action that needs to be transferred and a network topology structure, the transmitter is further configured to deliver a first flow table to the service gateway, where the first flow table is used for the service gateway to forward a packet to the virtual switch, and the transmitter is further configured to deliver a second flow table to the virtual switch, where the second flow table includes an instruction used to instruct the virtual switch to execute the action on the packet such that the virtual switch executes the action on the packet and sends a packet obtained after the action is executed to a destination server of the packet.

With reference to an implementation manner of the fifth aspect, in a first possible implementation manner, if the virtual switch has no related flow table, the receiver is further configured to receive a message that requests a processing rule of the packet and is sent by the virtual switch for the packet, and the transmitter delivers a third flow table to the virtual switch, where the third flow table is used for the virtual switch to send the packet obtained after the action is executed to the destination server of the packet.

With reference to the implementation manner of the fifth aspect, in a second possible implementation manner, the action includes at least one of packet encryption, packet decryption, deep packet inspection, data compression, or data decompression.

According to a sixth aspect, a service gateway is provided, including a transmitter, receiver, a processor, and a memory, where when load exceeds a preset threshold, the transmitter is configured to send a transfer processing request to a controller, where the transfer processing request includes an action that needs to be transferred such that the controller selects one server as a virtual switch, the receiver is configured to receive a flow table delivered by the controller, the memory is configured to store program code, and the processor is configured to invoke the program code stored in the memory to execute the following method forwarding a packet to the virtual switch according to the flow table such that the virtual switch executes the action on the packet and sends a packet obtained after the action is executed to a destination server of the packet.

With reference to an implementation manner of the sixth aspect, in a first possible implementation manner, the forwarding a packet to the virtual switch according to the flow table in the method executed by the processor is forwarding the packet encapsulated in an IP_IN_IP manner to the virtual switch through a first data channel according to the flow table.

With reference to the implementation manner of the sixth aspect, in a second possible implementation manner, the action includes at least one of packet encryption, packet decryption, deep packet inspection, data compression, or data decompression.

According to a seventh aspect, an OPENFLOW communication system is provided, including a controller, a service gateway, and at least one server, where the service gateway sends a transfer processing request to the controller, where the transfer processing request includes an action that needs to be transferred, the controller selects one server of the at least one server as a virtual switch according to the action that needs to be transferred and a network topology structure, the controller delivers a first flow table to the service gateway, the service gateway forwards a packet to the virtual switch according to the first flow table, the controller delivers a second flow table to the virtual switch, where the second flow table includes an instruction used to instruct the virtual switch to execute the action on the packet, and the virtual switch executes the action on the packet according to the second flow table and sends a packet obtained after the action is executed to a destination server of the packet.

With reference to an implementation manner of the seventh aspect, in a first possible implementation manner, if the virtual switch has no flow table for sending the packet to the destination server of the packet, the virtual switch is further configured to send, to the controller, a message that requests a processing rule of the packet, and the controller is further configured to deliver a third flow table to the virtual switch, where the third flow table is used for the virtual switch to send the packet obtained after the action is executed to the destination server of the packet.

With reference to the implementation manner of the seventh aspect, in a second possible implementation manner, the action includes at least one of packet encryption, packet decryption, deep packet inspection, data compression, or data decompression.

With reference to the implementation manner of the seventh aspect, in a third possible implementation manner, that the service gateway is configured to forward a packet to the virtual switch according to the first flow table is forward the packet encapsulated in an IP_IN_IP manner to the virtual switch according to the first flow table.

According to the present disclosure, a transfer processing request that indicates that transfer is needed and is sent by a service gateway is received, where the transfer processing request includes an action that needs to be transferred, one server is selected as a virtual switch according to the action that needs to be transferred and a network topology structure, a first flow table is delivered to the service gateway for the service gateway to forward a packet to the virtual switch, a second flow table is delivered to the virtual switch, where the second flow table includes an instruction used to instruct the virtual switch to execute the action on the packet such that the virtual switch executes the action on the packet and sends a packet obtained after the action is executed to a destination server of the packet, thereby implementing load balance among network elements in a system, improving utilization and a throughput of the system, and further enhancing performance of the entire system.

BRIEF DESCRIPTION OF DRAWINGS

To describe the technical solutions in the embodiments of the present disclosure or in the prior art more clearly, the following briefly introduces the accompanying drawings required for describing the embodiments or the prior art. Apparently, the accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure.

Figure 2:
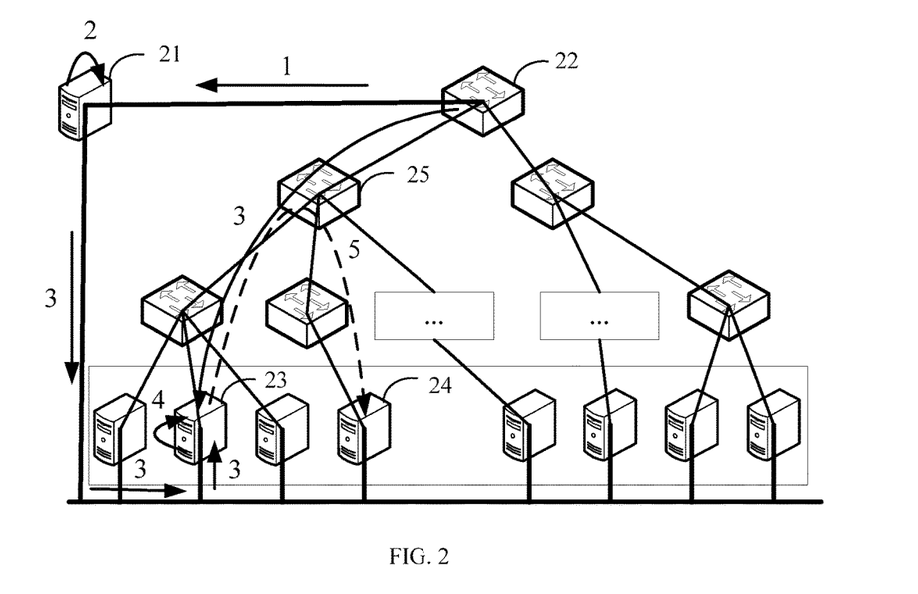
FIG. 2 is a diagram of an OPENFLOW network topology structure according to the present disclosure.
Figure 3:
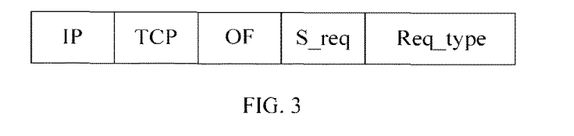
FIG. 3 is a schematic diagram of a format of a message reported by a service gateway to a controller in FIG. 2.

FIG. 2 is a diagram of an OPENFLOW network topology structure according to the present disclosure. As shown in FIG. 2, an OPENFLOW network topology includes a service gateway 22, a controller 21, a virtual switch 23, a destination server 24, and a router 25. Taking decryption as an example, when a packet decryption request is received, the service gateway 22 checks a load of a system, and if the load exceeds a given threshold, that is, a processing capability of the service gateway 22 is insufficient, executes the following process with reference to FIG. 2:

1. The service gateway 22 reports, to the controller 21, a requested resource that needs to be transferred. The requested resource that needs to be transferred corresponds to an action, where the action is a process of waiting for being processed, or an operation that needs to be executed, or the like. Assuming that the action herein is a decryption action, the requested resource that needs to be transferred is related to decryption. The service gateway 22 reports, to the controller 21 in a form of a resource request message, the requested resource that needs to be transferred. A specific format of the resource request message is shown in FIG. 3. The Internet Protocol (IP) includes a source IP and a destination IP. The source IP is an IP address of the service gateway 22, and the destination IP is an IP address of the controller 21. The Transmission Control Protocol (TCP) indicates that the resource request message is transmitted through a TCP protocol port, which may be a 6633 port in this embodiment. The OF indicates that a transmission process of the resource request message strictly complies with the OPENFLOW protocol. A value of S_req is 1, representing that the message is a resource request. Req_type represents a type of the message request, where a data length of the Req_type is 4 bytes, and 1 is an encryption resource, 2 is a decryption resource, and 3 is a compression resource. In other embodiments of the present disclosure, the action may be another action, for example, a decompression action and DPI scanning. Different actions correspond to different requested resources that need to be transferred. In this embodiment, that the service gateway 22 sends the resource request message to the controller 21 indicates that a resource, that is, a decryption resource, is requested according to the OPENFLOW protocol.

2. The controller 21 selects, according to a needed resource reported by the service gateway 22 and a network topology structure, one appropriate server from a back-end switch cluster as the virtual switch 23, of which a distance from a destination server may be a shortest path if possible.

Figure 4A:
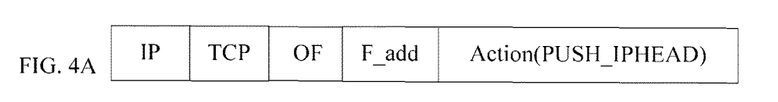
FIGS. 4A, 4B, 4C, 4D, 4E, and 4F are schematic diagrams of formats of messages delivered by a controller in FIG. 2.
Figure 4B:
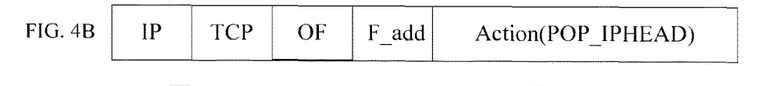
Figure 4C:
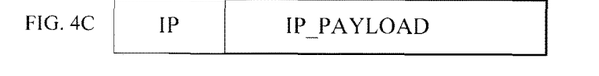
Figure 4D:
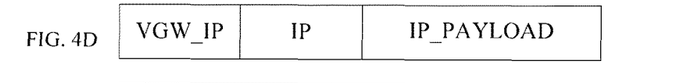
Figure 4E:
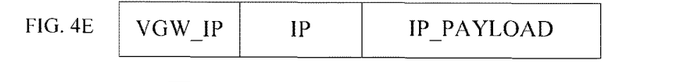
Figure 4F:
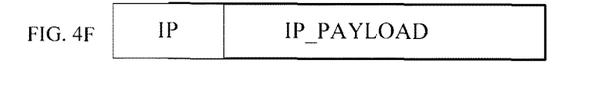
Figure 5:
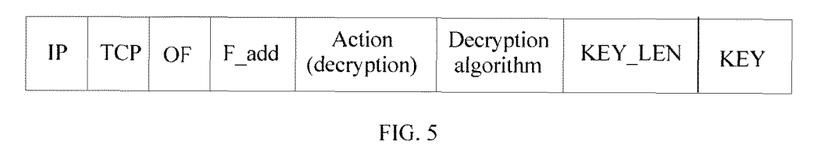
FIG. 5 is a schematic diagram of a format of a message of a second flow table delivered by a controller in FIG. 2.

3. The controller 21 delivers a first flow table, to establish a first data channel between the service gateway 22 and the virtual switch 23, where the first data channel is used for the service gateway 22 to forward a packet to the virtual switch 23. In an embodiment, the controller 21 delivers the first flow table to the service gateway 22. A format of the first flow table is shown in FIG. 4A, where F_add indicates addition of a flow table. PUSH_IPHEAD filled in the Action means an operation of adding an IP header. Meanings of the IP, TCP, and OF are the same as those in the resource request message in FIG. 3, and details are not described herein again. The controller 21 further delivers a first flow table to the virtual switch 23. A format of the first flow table is shown in FIG. 4B. POP_IPHEAD filled in the Action means an operation of deleting an IP header. In this embodiment of the present disclosure, data is transmitted between the service gateway 22 and the virtual switch 23 in an IP_IN_IP manner. To-be-transmitted data is a packet existing before the service gateway 22 performs a flow table operation, that is, an original packet, as shown in FIG. 4C. Based on this, the service gateway 22 executes an operation of encapsulating "VGW_IP" according to the flow table, to obtain a packet format generated after the flow table operation, where "VGW_IP" is an IP of the virtual switch 23, as shown in FIG. 4D. The service gateway 22 sends a packet obtained after the flow table operation to the virtual switch 23, to obtain the packet format, as shown in FIG. 4E, existing before the virtual switch 23 executes a flow table operation. The virtual switch 23 executes the flow table operation of deleting an IP header, to obtain a packet format, as shown in FIG. 4F, generated after the flow table operation. In other embodiments of the present disclosure, data may be transmitted in another manner, such as direct modification to a Media Access Control (MAC) address. At the same time when the service gateway 22 establishes the first data channel with the virtual switch 23 and transmits the data, the controller 21 further delivers a second flow table to the selected virtual switch 23. The second flow table includes an instruction used to instruct the virtual switch 23 to execute an action on the packet. A format of the second flow table delivered by the controller 21 to the virtual switch 23 is shown in FIG. 5, where a to-be-executed action is decryption, and KEY and KEY_LEN respectively mean a key and a length of the key.

4. The virtual switch 23 executes the decryption action to obtain original packet information.

5. The virtual switch 23 forwards the packet to the destination server 24 according to the original packet information. If the virtual switch 23 has no related flow table, a PACKET_IN message that requests a processing rule of the packet and is for the packet is sent to the controller 21, the controller 21 delivers a third flow table to establish a second data channel between the virtual switch 23 and the destination server 24, where the second data channel is used for the virtual switch 23 to send the packet obtained after the action is executed to the destination server 24 of the packet. In this embodiment of the present disclosure, the destination server 24 and the virtual switch 23 may be or may not be a same server. When the controller 21 establishes the second data channel between the virtual switch 23 and the destination server 24, the virtual switch 23 may establish the second data channel with the destination server using the router 25.

In this way, when the service gateway 22 detects that the load of the system exceeds the given threshold, the controller 21 transfers the action of the service gateway 22 to the virtual switch 23 for execution. Subsequently, if the service gateway 22 receives an action request and detects that the load of the system exceeds the given threshold, the service gateway 22 repeats execution of the foregoing process to transfer an action of the service gateway 22 to the virtual switch 23 for execution until the service gateway 22 has not receives the action request any more or has not detected that the load of the system exceeds the given threshold. In this case, the system is stable. In this way, when a processing capability of the service gateway 22 is insufficient, some of data processing services are transferred from the service gateway 22 to the virtual switch 23 for execution, which can implement load balance among network elements in the system, improve utilization and a throughput of the system, and further enhance performance of the entire system.

Figure 6:
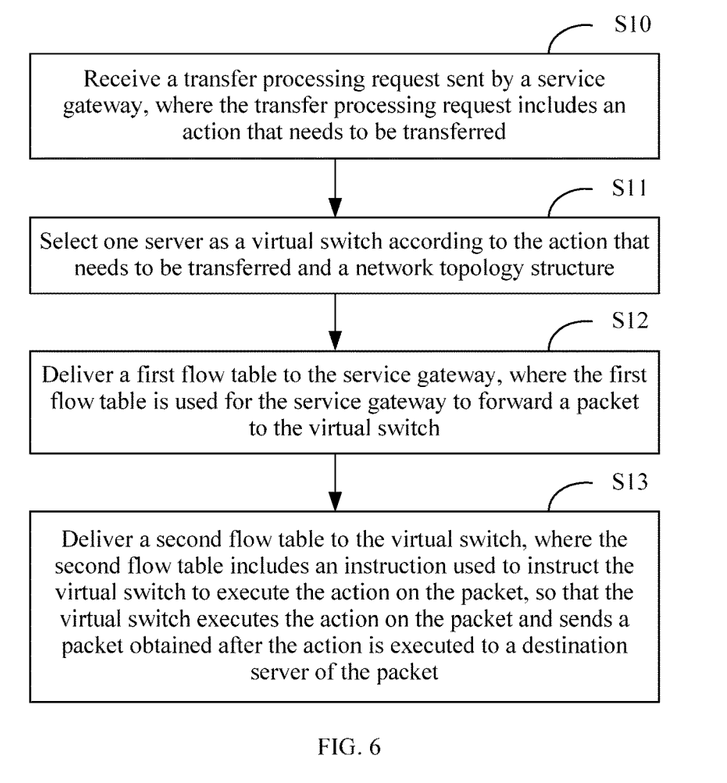
FIG. 6 is a schematic flowchart of an OPENFLOW communication method according to a first embodiment of the present disclosure.

FIG. 6 is a schematic flowchart of an OPENFLOW communication method according to a first embodiment of the present disclosure. As shown in FIG. 6, the OPENFLOW communication method includes the following steps:

S10. Receive a transfer processing request sent by a service gateway, where the transfer processing request includes an action that needs to be transferred.

The action is a process of waiting for being processed, or an operation that needs to be executed, or the like. The action includes at least one of packet encryption, packet decryption, deep packet inspection, data compression, or data decompression. In S10, when the service gateway detects that load of a system exceeds a given threshold, the action needs to be transferred. Receiving the action that needs to be transferred and is sent by the service gateway is receiving a requested resource that is related to the action and sent by the service gateway such that the action is transferred to another network element for execution.

S11. Select one server as a virtual switch according to the action that needs to be transferred and a network topology structure.

S12. Deliver a first flow table to the service gateway, where the first flow table is used for the service gateway to forward a packet to the virtual switch.

In S12, at the same time when the first flow table is delivered to the service gateway, a first flow table is further delivered to the virtual switch. The first flow table delivered to the service gateway indicates an operation of adding an IP header, which means that an IP of the virtual switch is encapsulated, based on an original packet, into the packet forwarded by the service gateway to the virtual switch. The first flow table delivered to the virtual switch indicates an operation of deleting the IP header, that is, removing the encapsulated IP from the received packet forwarded by the service gateway such that the virtual switch may acquire the original packet.

S13. Deliver a second flow table to the virtual switch, where the second flow table includes an instruction used to instruct the virtual switch to execute the action on the packet such that the virtual switch executes the action on the packet and sends a packet obtained after the action is executed to a destination server of the packet. In an embodiment, the delivered second flow table further includes resource information corresponding to the action such that the virtual switch executes the action on the packet according to the resource information. For example, a decryption operation is executed according to key information related to decryption.

In S13, the action includes at least one of packet encryption, packet decryption, deep packet inspection, data compression, or data decompression. The resource information corresponding to the action includes a key, a DPI rule, or the like. In this way, when a processing capability of the service gateway is insufficient, some of data processing services are transferred from the service gateway to a virtual server for execution, which can implement load balance among network elements in the system, improve utilization and a throughput of the system, and further enhance performance of the entire system.

If the virtual switch has no flow table for sending the packet to the destination server of the packet, a PACKET_IN message sent by the virtual switch is received, and a third flow table is generated. The third flow table is delivered to the virtual switch to establish a second data channel between the virtual switch and the destination server, where the third flow table is used for the virtual switch to send the packet obtained after the action is executed to the destination server of the packet. In this embodiment of the present disclosure, the destination server and the virtual switch may be or may not be a same server. When the second data channel is established between the virtual switch and the destination server, the second data channel may be established between the virtual switch and the destination server using a router.

Figure 7:
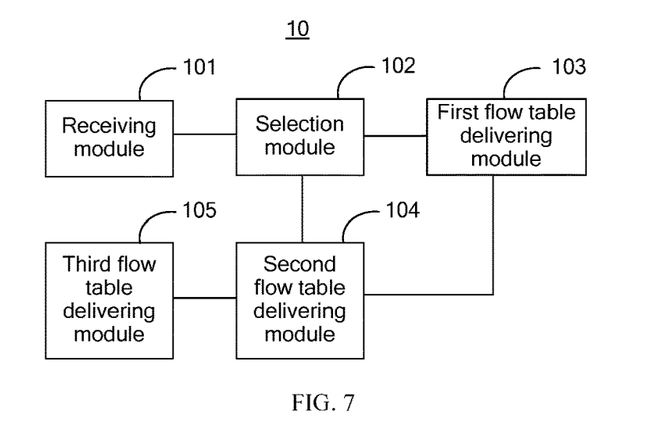
FIG. 7 is a schematic structural diagram of a controller according to a first embodiment of the present disclosure.

FIG. 7 is a schematic structural diagram of a controller according to a first embodiment of the present disclosure. As shown in FIG. 7, the controller 10 includes a receiving module 101, a selection module 102, a first flow table delivering module 103, a second flow table delivering module 104, and a third flow table delivering module 105.

The receiving module 101 is configured to receive a transfer processing request sent by a service gateway, where the transfer processing request includes an action that needs to be transferred. The selection module 102 is connected to the receiving module 101 and configured to select one server as a virtual switch according to the action that needs to be transferred and a network topology structure. The action is a process of waiting for being processed, or an operation that needs to be executed, or the like. The action includes at least one of packet encryption, packet decryption, deep packet inspection, data compression, or data decompression. The first flow table delivering module 103 is connected to the selection module 102 and configured to deliver a first flow table to the service gateway to establish a first data channel between the service gateway and the virtual switch, where the first flow table is used for the service gateway to forward a packet to the virtual switch. In this embodiment of the present disclosure, at the same time when the first flow table delivering module 103 delivers the first flow table to the service gateway, the first flow table delivering module 103 further delivers a first flow table to the virtual switch. The first flow table delivered to the service gateway indicates an operation of adding an IP header, which means that an IP of the virtual switch is encapsulated, based on an original packet, into the packet forwarded by the service gateway to the virtual switch. The first flow table delivered to the virtual switch indicates an operation of deleting the IP header, that is, removing the encapsulated IP from the received packet forwarded by the service gateway such that the virtual switch may acquire the original packet. The second flow table delivering module 104 is connected to the selection module 102 and the first flow table delivering module 103 and configured to deliver a second flow table to the virtual switch, where the second flow table includes an instruction used to instruct the virtual switch to execute the action on the packet such that the virtual switch executes the action on the packet and sends a packet obtained after the action is executed to a destination server of the packet. Further, the second flow table further includes resource information corresponding to the action, where the resource information includes information related to an operation of executing the action, such as a key or a DPI rule. In this embodiment of the present disclosure, the virtual switch has no flow table for sending the packet to the destination server of the packet, the receiving module 101 is further configured to receive a PACKET_IN message that is sent by the virtual switch for the packet. The third flow table delivering module 105 delivers a third flow table to the virtual switch to establish a second data channel between the virtual switch and the destination server, where the third flow table is used for the virtual switch to send the packet obtained after the action is executed to the destination server of the packet. In this way, when a processing capability of the service gateway is insufficient, some of data processing services are transferred from the service gateway to a virtual server for execution, which can implement load balance among network elements in a system, improve utilization and a throughput of the system, and further enhance performance of the entire system.

Figure 8:
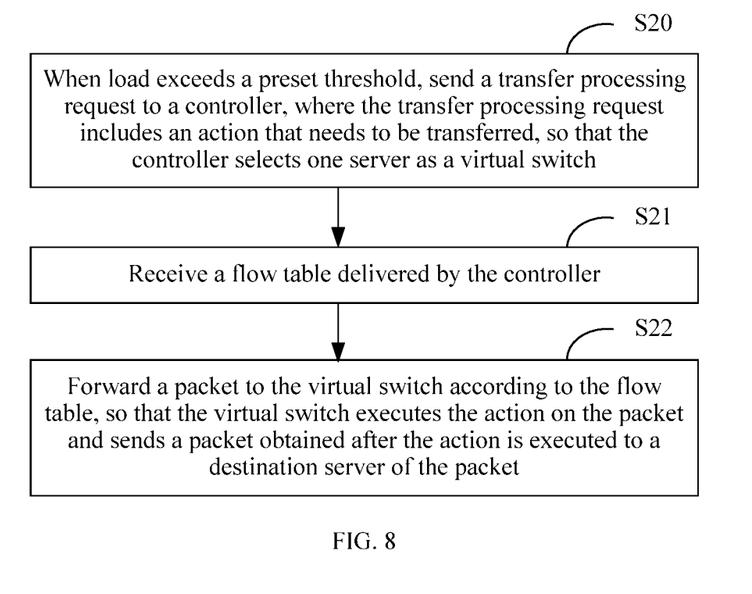
FIG. 8 is a schematic flowchart of an OPENFLOW communication method according to a second embodiment of the present disclosure.

FIG. 8 is a schematic flowchart of an OPENFLOW communication method according to a second embodiment of the present disclosure. As shown in FIG. 8, the OPENFLOW communication method includes S20. When load exceeds a preset threshold, send a transfer processing request to a controller, where the transfer processing request includes an action that needs to be transferred such that the controller selects one server as a virtual switch. The action is a process of waiting for being processed, or an operation that needs to be executed, or the like. The action includes at least one of packet encryption, packet decryption, deep packet inspection, data compression, or data decompression.

S21. Receive a flow table delivered by the controller.

S22. Forward a packet to the virtual switch according to the flow table such that the virtual switch executes the action on the packet and sends a packet obtained after the action is executed to a destination server of the packet. In S22, the packet encapsulated in an IP_IN_IP manner is forwarded to the virtual switch according to the flow table. An IP of the virtual switch is encapsulated, based on an original packet, into the packet forwarded by the service gateway to the virtual switch. After the virtual switch receives the packet forwarded by the service gateway, the encapsulated IP is removed, and the original packet may be obtained.

In this embodiment of the present disclosure, when load exceeds a preset threshold, some of data processing services are transferred from a service gateway to a virtual server for execution, which can implement load balance among network elements in a system, improve utilization and a throughput of the system, and further enhance performance of the entire system.

Figure 9:
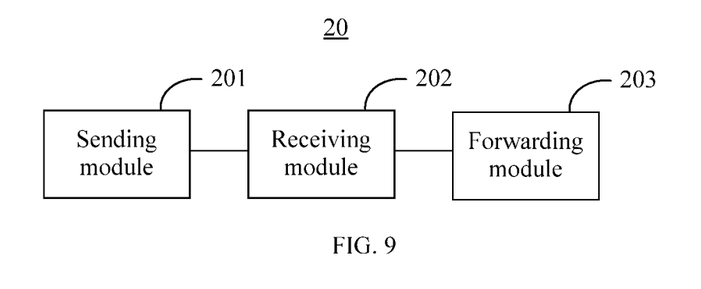
FIG. 9 is a schematic structural diagram of a service gateway according to a first embodiment of the present disclosure.

FIG. 9 is a schematic structural diagram of a service gateway according to a first embodiment of the present disclosure. As shown in FIG. 9, the service gateway 20 includes a sending module 201, a receiving module 202, and a forwarding module 203.

The sending module 201 is configured to, when load exceeds a preset threshold, send a transfer processing request to a controller, where the transfer processing request includes an action that needs to be transferred such that the controller selects one server as a virtual switch. The action is a process of waiting for being processed, or an operation that needs to be executed, or the like. The action includes at least one of packet encryption, packet decryption, deep packet inspection, data compression, or data decompression. The receiving module 202 is connected to the sending module 201 and configured to receive a flow table delivered by the controller. The forwarding module 203 is connected to the receiving module 202 and configured to forward a packet to the virtual switch according to the flow table such that the virtual switch executes the action on the packet and sends a packet obtained after the action is executed to a destination server of the packet. The forwarding module 203 forwards the packet encapsulated in an IP_IN_IP manner to the virtual switch according to the packet. An IP of the virtual switch is encapsulated, based on an original packet, into the packet forwarded by the service gateway to the virtual switch. After the virtual switch receives the packet forwarded by the service gateway, the encapsulated IP is removed, and the original packet may be obtained.

In this embodiment of the present disclosure, when load exceeds a preset threshold, a sending module 201 sends a transfer processing request to a controller, where the transfer processing request includes an action that needs to be transferred such that the controller selects one server as a virtual switch, a receiving module 202 receives a flow table delivered by the controller, a forwarding module 203 forwards a packet to the virtual switch according to the data flow table such that the virtual switch executes the action on the packet and sends a packet obtained after the action is executed to a destination server of the packet. In this way, when a processing capability of the service gateway is insufficient, some of data processing services are transferred from the service gateway to a virtual server for execution, which can implement load balance among network elements in a system, improve utilization and a throughput of the system, and further enhance performance of the entire system.

Figure 10:
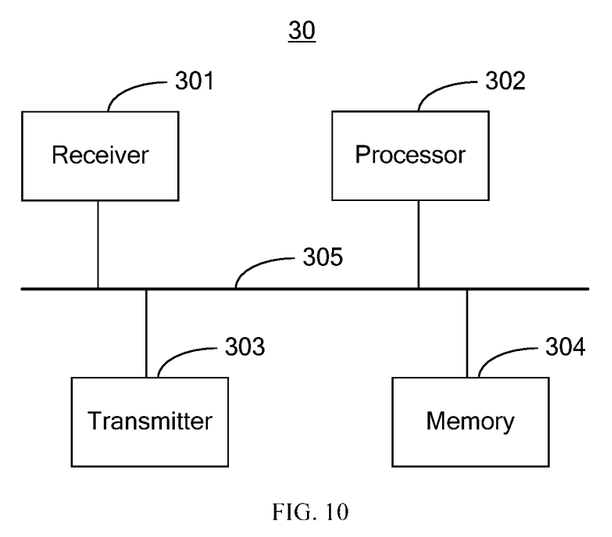
FIG. 10 is a schematic structural diagram of a controller according to a second embodiment of the present disclosure.

FIG. 10 is a schematic structural diagram of a controller according to a second embodiment of the present disclosure. As shown in FIG. 10, the controller 30 includes a receiver 301, a processor 302, a transmitter 303, a memory 304, and a data bus 305. The receiver 301, the processor 302, the transmitter 303, and the memory 304 are connected using the data bus 305 for mutual communication.

In this embodiment of the present disclosure, the receiver 301 is configured to receive a transfer processing request sent by a service gateway, where the transfer processing request includes an action that needs to be transferred. The memory is configured to store program code. The processor 302 is configured to invoke the program code stored in the memory to execute the following method selecting one server as a virtual switch according to the action that needs to be transferred and a network topology structure. The action is a process of waiting for being processed, or an operation that needs to be executed, or the like. The action includes at least one of packet encryption, packet decryption, deep packet inspection, data compression, or data decompression. The transmitter 303 delivers a first flow table to the service gateway to establish a first data channel between the service gateway and the virtual switch, where the first flow table is used for the service gateway to forward a packet to the virtual switch. In this embodiment of the present disclosure, at the same time when the transmitter 303 delivers the first flow table to the service gateway, a first flow table is further delivered to the virtual switch. The first flow table delivered to the service gateway indicates an operation of adding an IP header, which means that an IP of the virtual switch is encapsulated, based on an original packet, into the packet forwarded by the service gateway to the virtual switch. The first flow table delivered to the virtual switch indicates an operation of deleting the IP header, that is, removing the encapsulated IP from the received packet forwarded by the service gateway such that the virtual switch may acquire the original packet.

The transmitter 303 further delivers a second flow table to the virtual switch, where the second flow table includes an instruction used to instruct the virtual switch to execute the action on the packet such that the virtual switch executes the action on the packet and sends a packet obtained after the action is executed to a destination server of the packet. The second flow table may further include resource information corresponding to the action, where the resource information corresponding to the action includes a key, a DPI rule, or the like. The memory 304 is further configured to store the network topology structure, the first flow table delivered by the transmitter 303 to the service gateway, and the second flow table delivered by the transmitter 303 to the virtual switch. If the virtual switch has no related flow table, the receiver receives a PACKET_IN message sent by the virtual switch. The transmitter delivers a third flow table to the virtual switch, where the third flow table is used for the virtual switch to send the packet obtained after the action is executed to the destination server of the packet. In this embodiment of the present disclosure, some of data processing services are transferred from a service gateway to a virtual server for execution, which can implement load balance among network elements in a system, improve utilization and a throughput of the system, and further enhance performance of the entire system.

Figure 11:
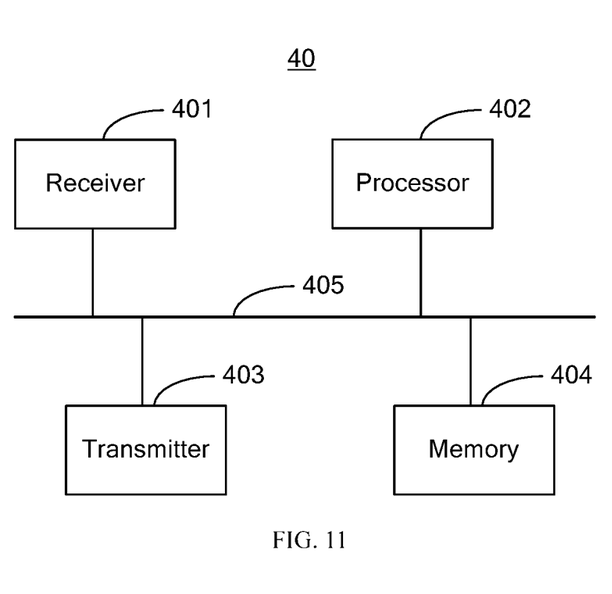
FIG. 11 is a schematic structural diagram of a service gateway according to a second embodiment of the present disclosure.

FIG. 11 is a schematic structural diagram of a service gateway according to a second embodiment of the present disclosure. As shown in FIG. 11, the service gateway 40 includes a receiver 401, a processor 402, a transmitter 403, a memory 404, and a communications bus 405. The receiver 401, processor 402, transmitter 403, and memory 404 are connected using the data bus 405 for mutual communication.

In this embodiment of the present disclosure, when load exceeds a preset threshold, a transmitter 403 is configured to send a transfer processing request to a controller, where the transfer processing request includes an action that needs to be transferred such that the controller selects one server as a virtual switch. The action is a process of waiting for being processed, or an operation that needs to be executed, or the like. The action includes at least one of packet encryption, packet decryption, deep packet inspection, data compression, or data decompression. A receiver 401 is configured to receive a flow table delivered by the controller. A memory is configured to store program code. The memory is further configured to store the flow table. The processor 402 invokes the program code stored in the memory to execute the following method: forwarding a packet to the virtual switch according to the flow table such that the virtual switch executes the action on the packet and sends a packet obtained after the action is executed to a destination server of the packet. In a method executed by the processor 402, the packet encapsulated in an IP_IN_IP manner is forwarded to the virtual switch according to the flow table. An IP of the virtual switch is encapsulated, based on an original packet, into the packet forwarded by the service gateway to the virtual switch. After the virtual switch receives the packet forwarded by the service gateway, the encapsulated IP is removed, and the original packet may be obtained. The memory 404 stores the action that needs to be transferred and the flow table delivered by the controller. In this embodiment of the present disclosure, when load exceeds a preset threshold, some of data processing services are transferred from the service gateway to a virtual server for execution, which can implement load balance among network elements in a system, improve utilization and a throughput of the system, and further enhance performance of the entire system.

Figure 12:
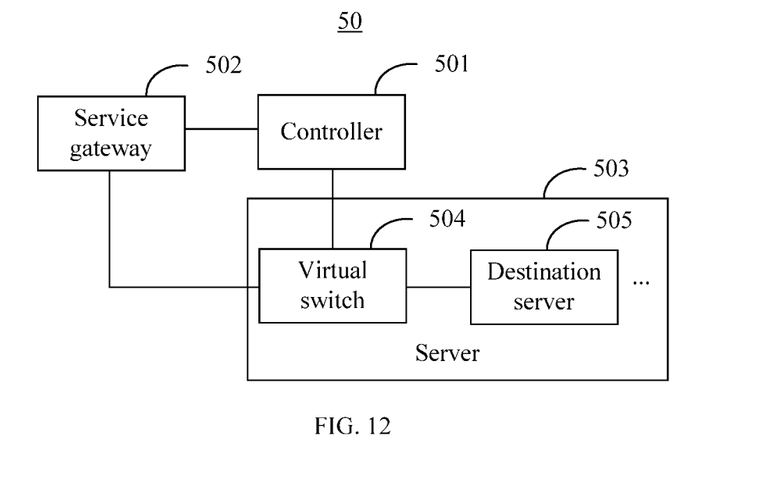
FIG. 12 is a schematic structural diagram of an OPENFLOW communication system according to a first embodiment of the present disclosure.

Referring to FIG. 12, FIG. 12 is a schematic structural diagram of an OPENFLOW communication system according to a first embodiment of the present disclosure. As shown in FIG. 12, the OPENFLOW communication system 50 includes a controller 501, a service gateway 502, and a server 503. There are multiple servers 503 and one of the multiple servers may be selected as a virtual switch 504 or a destination server 505. The service gateway 502 sends a transfer processing request to the controller 501, where the transfer processing request includes an action that needs to be transferred. The action is a process of waiting for being processed, or an operation that needs to be executed, or the like. The action includes at least one of packet encryption, packet decryption, deep packet inspection, data compression, or data decompression. The controller 501 selects one server 503 as the virtual switch 504 according to the action that needs to be transferred and a network topology structure. The controller 501 delivers a first flow table to the service gateway 502. The service gateway 502 forwards a packet to the virtual switch 504 according to the first flow table. The service gateway 502 forwards the packet encapsulated in an IP_IN_IP manner to the virtual switch 504 according to the first flow table. An IP of the virtual switch is encapsulated, based on an original packet, into the packet forwarded by the service gateway to the virtual switch. After the virtual switch receives the packet forwarded by the service gateway, the encapsulated IP is removed, and the original packet may be obtained. The controller 501 delivers a second flow table to the virtual switch 504, where the second flow table includes an instruction used to instruct the virtual switch 504 to execute the action on the packet. The virtual switch 504 executes the action on the packet according to the second flow table and sends a packet obtained after the action is executed to the destination server 505 of the packet. Further, the second flow table further includes resource information corresponding to the action, such as key information related to decryption such that the virtual switch 504 executes the action according to the resource information. If the virtual switch 504 has no flow table sending the packet to the destination server 505 of the packet, the virtual switch 504 sends a PACKET_IN message that requests a processing rule of the packet to the controller 501. The controller 501 delivers a third flow table to the virtual switch 504, where the third flow table is used for the virtual switch 504 to send the packet obtained after the action is executed to the destination server 505 of the packet. Therefore, when a processing capability of the service gateway 502 is insufficient, some of data processing services are transferred from the service gateway 502 to a virtual server for execution, which can implement load balance among network elements in a system, improve utilization and a throughput of the system, and further enhance performance of the entire system.

In conclusion, according to the present disclosure, a transfer processing request sent by a service gateway is received, where the transfer processing request includes an action that needs to be transferred, one server is selected as a virtual switch according to the action that needs to be transferred and a network topology structure, then a first flow table is delivered to the service gateway, where the first flow table is used for the service gateway to forward a packet to the virtual switch, a second flow table is delivered to the virtual switch, where the second flow table includes an instruction used to instruct the virtual switch to execute the action on the packet such that the virtual switch executes the action on the packet and sends a packet obtained after the action is executed to a destination server of the packet. When a processing capability of the service gateway is insufficient, some of data processing services are transferred from the service gateway to a virtual server for execution, which can implement load balance among network elements in a system, improve utilization and a throughput of the system, and further enhance performance of the entire system.

The foregoing descriptions are merely embodiments of the present disclosure, and the protection scope of the present disclosure is not limited thereto. All equivalent structure or process changes made according to the content of this specification and accompanying drawings in the present disclosure or by directly or indirectly applying the present disclosure in other related technical fields shall fall within the protection scope of the present disclosure.

What is claimed is:

1. A communication method, comprising:
   receiving a transfer processing request sent by a service gateway, wherein the transfer processing request comprises an action that needs to be transferred;
   selecting one server as a virtual switch based on the action that needs to be transferred and a network topology structure;
   delivering a first flow table to the service gateway, wherein the first flow table is used by the service gateway to forward a packet to the virtual switch; and
   delivering a second flow table to the virtual switch, wherein the second flow table comprises an instruction used to instruct the virtual switch to execute the action on the packet such that the virtual switch executes the action on the packet and sends the packet obtained after the action is executed to a destination server of the packet.

2. The communication method of claim 1, wherein, when the virtual switch has no flow table for sending the packet to the destination server of the packet, the method further comprises:
   receiving a message that requests a processing rule of the packet and is sent by the virtual switch for the packet; and
   delivering a third flow table to the virtual switch, wherein the third flow table is used by the virtual switch to send the packet obtained after the action is executed to the destination server of the packet.

3. The communication method of claim 1, wherein the action comprises at least one of packet encryption, packet decryption, deep packet inspection, data compression, or data decompression.

4. A communication method, comprising:
   sending a transfer processing request to a controller when a load exceeds a preset threshold, wherein the transfer processing request comprises an action that needs to be transferred such that the controller selects one server as a virtual switch;
   receiving a flow table delivered by the controller; and
   forwarding a packet to the virtual switch based on the flow table such that the virtual switch executes the action on the packet and sends a packet obtained after the action is executed to a destination server of the packet.

5. The communication method of claim 4, wherein forwarding a packet to the virtual switch based on the flow table comprises forwarding the packet by encapsulating an IP in another IP (IP_IN_IP) manner to the virtual switch based on the flow table.

6. The communication method of claim 4, wherein the action comprises at least one of packet encryption, packet decryption, deep packet inspection, data compression, or data decompression.

7. A controller, comprising:
a receiver configured to receive a transfer processing request sent by a service gateway, wherein the transfer processing request comprises an action that needs to be transferred;
a memory configured to store program code;
a processor coupled to the memory and the receiver, wherein the processor is configured to invoke the program code stored in the memory to select one server as a virtual switch according to the action that needs to be transferred and a network topology structure; and
a transmitter coupled to the processor and configured to:
deliver a first flow table to the service gateway, wherein the first flow table is used by the service gateway to forward a packet to the virtual switch; and
deliver a second flow table to the virtual switch, wherein the second flow table comprises an instruction used to instruct the virtual switch to execute the action on the packet such that the virtual switch executes the action on the packet and sends the packet obtained after the action is executed to a destination server of the packet.

8. The controller according to claim 7, wherein when the virtual switch has no related flow table, the receiver is further configured to receive a message that requests a processing rule of the packet and is sent by the virtual switch for the packet, and the transmitter is further configured to deliver a third flow table to the virtual switch, wherein the third flow table is used for the virtual switch to send the packet obtained after the action is executed to the destination server of the packet.

9. The controller of claim 7, wherein the action comprises at least one of packet encryption, packet decryption, deep packet inspection, data compression, or data decompression.

10. A service gateway, comprising:
a transmitter configured to send a transfer processing request to a controller when a load exceeds a preset threshold, wherein the transfer processing request comprises an action that needs to be transferred such that the controller selects one server as a virtual switch;
a receiver configured to receive a flow table delivered by the controller;
a memory configured to store program code; and
a processor coupled to the transmitter, receiver, and memory, wherein the processor is configured to invoke the program code stored in the memory to forward a packet to the virtual switch based on the flow table such that the virtual switch executes the action on the packet and sends a packet obtained after the action is executed to a destination server of the packet.

11. The service gateway according to claim 10, wherein the forwarding a packet to the virtual switch according to the flow table in the method executed by the processor is: forwarding the packet encapsulated by encapsulating an IP in another IP (IP_IN_IP) manner to the virtual switch through a first data channel according to the flow table.

12. The service gateway of claim 10, wherein the action comprises at least one of packet encryption, packet decryption, deep packet inspection, data compression, or data decompression.

13. A communication system comprising:
a service gateway configured to send a transfer processing request to a controller, wherein the transfer processing request comprises an action that needs to be transferred; and
a controller coupled to the service gateway and configured to send a server as a virtual switch of the action that needs to be transferred and a network topology structure,
wherein the controller delivers a first flow table to the service gateway,
wherein the service gateway forwards a packet to the virtual switch based on the first flow table,
wherein the controller delivers a second flow table to the virtual switch,
wherein the second flow table comprises an instruction used to instruct the virtual switch to execute the action on the packet, and
wherein the virtual switch executes the action on the packet based on the second flow table and sends a packet obtained after the action is executed to a destination server of the packet.

14. The communication system of claim 13, wherein when the virtual switch has no flow table for sending the packet to the destination server of the packet, the virtual switch is further configured to send a message that requests a processing rule of the packet to the controller, and wherein the controller is further configured to deliver a third flow table to the virtual switch, wherein the third flow table is used for the virtual switch to send the packet obtained after the action is executed to the destination server of the packet.

15. The communication system of claim 13, wherein the action comprises at least one of packet encryption, packet decryption, deep packet inspection, data compression, or data decompression.

16. The communication system of claim 13, wherein that the service gateway is further configured to forward a packet to the virtual switch according to the first flow table comprising forwarding the packet encapsulated by encapsulating an IP in another IP (IP_IN_IP) manner to the virtual switch according to the first flow table.

* * * * *

UNITED STATES PATENT AND TRADEMARK OFFICE
CERTIFICATE OF CORRECTION

PATENT NO. : 10,148,565 B2
APPLICATION NO. : 15/369191
DATED : December 4, 2018
INVENTOR(S) : Ren Zhu et al.

Page 1 of 1

It is certified that error appears in the above-identified patent and that said Letters Patent is hereby corrected as shown below:

On the Title Page

Page (2), Item (56), OTHER PUBLICATIONS, Line 6: "seduce" should read "Reduce"

Page (2), Item (56), OTHER PUBLICATIONS, Line 34: "Version L3.0" should read "Version 1.3.0"

Signed and Sealed this
Twelfth Day of February, 2019

Andrei Iancu
*Director of the United States Patent and Trademark Office*